J. FROLEK.
OBSERVATION CAMERA MOUNT.
APPLICATION FILED AUG. 22, 1918.
1,300,716.
Patented Apr. 15, 1919.
2 SHEETS—SHEET 1.
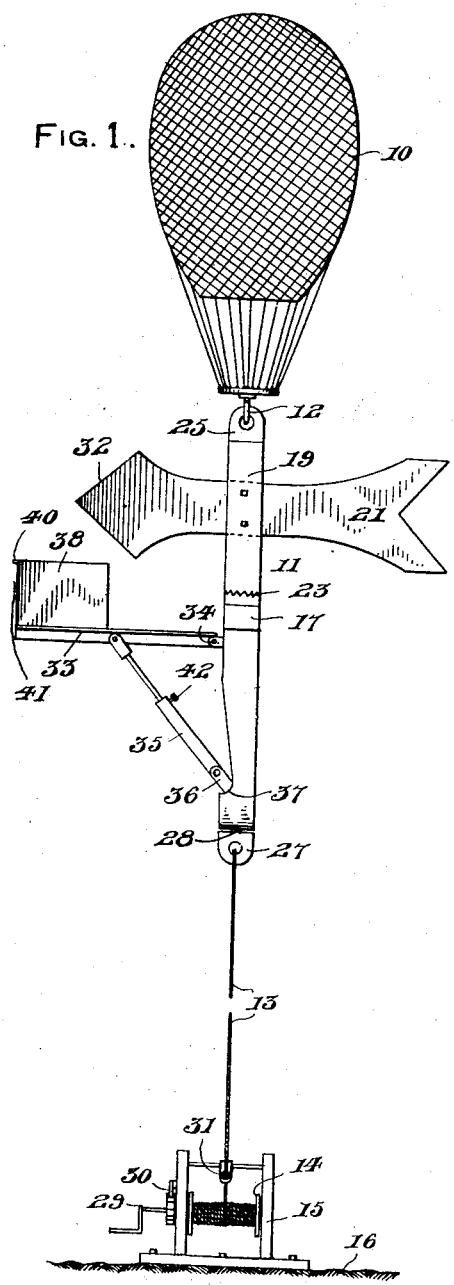
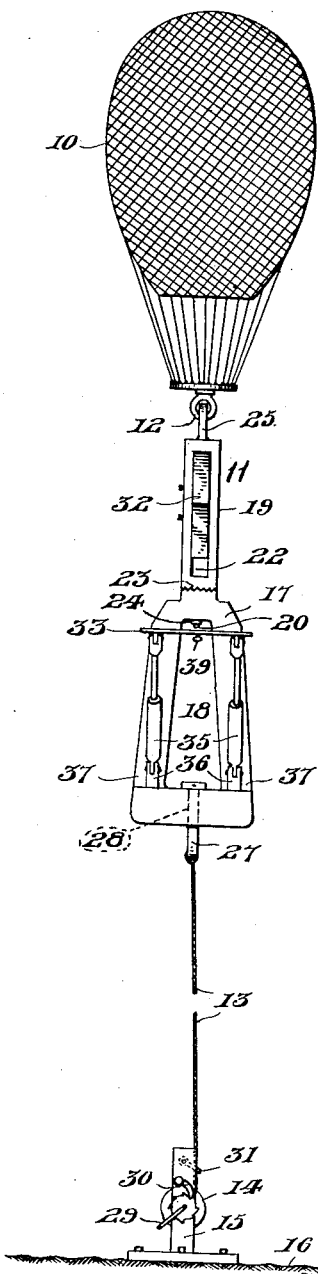
Inventor
J. Frolek
By A. M. Wilson
Attorney J. FROLEK.
OBSERVATION CAMERA MOUNT.
APPLICATION FILED AUG. 22, 1918.
1,300,716.
Patented Apr. 15, 1919.
2 SHEETS—SHEET 2.
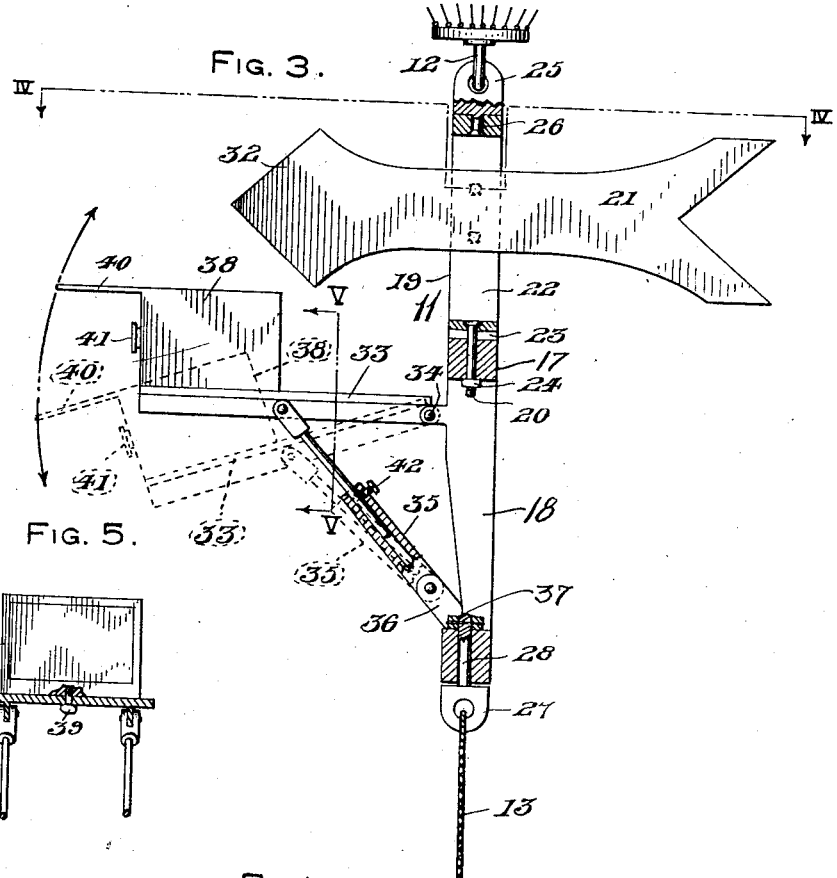
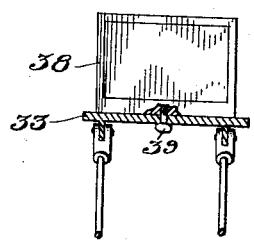
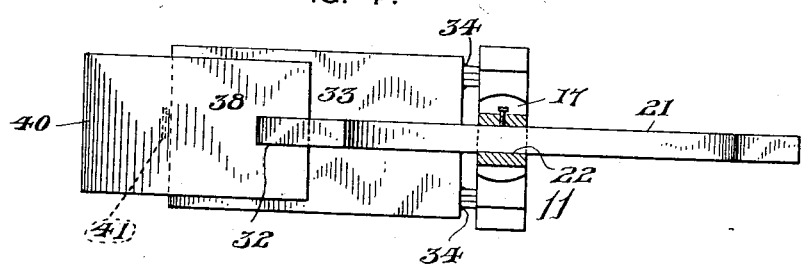
Inventor
J. Frolek
By A. M. Wilson
Attorney

UNITED STATES PATENT OFFICE.

JOHN FROLEK, OF TRAPP LAKE, BRITISH COLUMBIA, CANADA.

OBSERVATION-CAMERA MOUNT.

1,300,716. Specification of Letters Patent. Patented Apr. 15, 1919.

Application filed August 22, 1918. Serial No. 251,006.

*To all whom it may concern:*

Be it known that I, JOHN FROLEK, a citizen of the Dominion of Canada, residing at Trapp Lake, in the Province of British Columbia and Dominion of Canada, have invented certain new and useful Improvements in Observation - Camera Mounts, of which the following is a specification.

The primary object of the invention is the provision of a ready means for mounting a camera in an elevated position for taking pictures of distant points such as the territory of the enemy in time of war.

A further object of the invention is to provide a camera-holding attachment for captive balloons whereby a camera may be maintained at a distant altitude pointed in any desired direction for taking pictures of distant objects located upon the ground.

A still further object of the invention is to provide a camera-holder adapted to be elevated by a balloon and having means for maintaining the holder in a certain position relatively of the direction of the wind and whereby a camera may be secured at any side of the holder for use in taking pictures in any direction when the holder is elevated.

With these general objects in view, the device consists in the combination and arrangement of parts hereinafter fully described in connection with the accompanying drawings and in which like reference characters designate corresponding parts throughout the several views.

In the drawings,

Figure 1 is a side elevation of the invention with the cable broken away;

Fig. 2 is an elevational view taken from a different side thereof with the camera removed;

Fig. 3 is an enlarged side elevation of the holder and camera with parts broken away and parts illustrated by dotted lines with the camera in its tilted position;

Fig. 4 is a horizontal sectional view taken upon line IV—IV of Fig. 3; and

Fig. 5 is a vertical sectional view taken upon line V—V of Fig. 3.

Referring more in detail to the drawings, my invention contemplates the employment of a balloon 10 of suitable size having a camera-holder 11 suspended from a ring 12 at the bottom of the balloon and attached by a cable 13 to the winding drum 14 of a windlass 15 positioned upon the ground 16.

The holder 11 consists of a plate 17 having a central opening 18 for rendering the same light in weight while a shaft 19 is connected to the top of the plate by means of a bolt 20. An arrow or vane 21 is secured through a longitudinal slot 22 of the shaft 19 while a toothed connection 23 between the said shaft and plate permits relative rotative adjustment of the shaft and plate by means of the bolt 20 which may be loosened and tightened by manipulating the nut 24 upon the said bolt permitting said parts to turn upon each other and to be retained in their adjusted positions.

An eye piece 25 is swivelly connected as at 26 to the upper end of the shaft 19, said eye being connected with the ring 12 of the balloon. A block 27 is swivelly connected as at 28 to the lower end of the plate 17 and to which block the cable 13 is attached. It will be seen that the balloon 10 will rise in the air, carrying the camera-holder 11 with the same while the cable 13 is unwound from the drum 14. A crank 29 is provided for the drum 14 as well as a pawl and ratchet 30 while a suitable guide 31 is carried by the windlass 15 through which the cable 13 extends. The arrow 21 is maintained with its head 32 pointing in the direction from which the wind is blowing, whereby the holder 11 is maintained relatively of the direction of the wind.

A platform 33 is connected by hinges 34 with the plate 17 while adjustable struts 35 connect the said platform with lugs 36 positioned in side recesses 37 of the plate 17. A camera such as 38 is detachably mounted upon the platform 33 retained in position by any suitable means such as a screw 39 extending through the platform and threaded into the bottom of the camera.

A hood 40 is preferably provided projecting from the upper forward edge of the camera 38 for preventing the sun from shining into the lens 41 of the camera. Screws 42 are provided for the struts 35, whereby the struts may be retained at suitable adjustments to position the platform 33 at the desired inclination to point the lens of the camera 38 toward the position which it is desired to photograph. The direction of the wind is noted by the observer who swings the plate 17 around upon the shaft 19 to the desired position to have the camera 38 point to the desired direction when elevated and upon tightening the bolt 20, the balloon 10 is released and permitted to ascend under the control of the cable 13. It will be understood that any form of camera 38 may be employed as well as means for tripping the lens when the holder 11 reaches the desired altitude and which mechanism is not herein illustrated. By means of my invention pictures of distant landscapes may be easily taken without any danger or risk on the part of the observer while the mechanism is simple in construction and capable of use for many operations.

What I claim as new is:—

1. A device of the class described comprising an elevating means, a holder swivelly suspended therefrom, a wind-operating vane carried by the holder, and an adjustable platform upon the holder.

2. A device of the class described comprising an elevating means, a holder swivelly suspended therefrom, a wind-operating vane carried by the holder, a camera support adjustably carried by said holder, and a controlling cable having one end swivelly connected to the lower end of the holder and its other end anchored upon the ground.

3. A camera-holder comprising a balloon, a shaft swivelly connected beneath the balloon, a wind-positioning vane transversely secured through said shaft, a plate adjustably rotatable upon the bottom of said shaft, a controlling cable swiveled to the bottom of said plate, a windlass operatively connected to said cable, and a camera support carried by one side of said plate.

4. A camera-holder comprising a balloon, a shaft swivelly connected beneath the balloon, a wind-positioning vane transversely secured through said shaft, a plate adjustably rotatable upon the bottom of said shaft, a controlling cable swiveled to the bottom of said plate, a windlass operatively connected to said cable, a platform hinged at one side of the plate, adjustable struts connected between said platform and plate adapted for maintaining the platform at different inclinations with the plate positioned upright between said balloon and cable during the operation of the device, and camera-retaining means carried by said platform.

5. In combination with an elevating balloon, a shaft suspended therefrom, means adapted for automatically maintaining said shaft with one side thereof positioned in the direction from which the wind is blowing, a plate suspended from said shaft, adjustment-retaining connections between said shaft and plate whereby one side of the plate is positioned relatively of the wind-engaging side of the shaft, a camera mounting platform carried by the plate adjustably inclined with respect to the plate, and controlling means connecting the plate to the ground when the balloon is elevated during the operation of the device.

In testimony whereof I affix my signature.

JOHN FROLEK.

Copies of this patent may be obtained for five cents each, by addressing the "Commissioner of Patents, Washington, D. C."